United States Patent [19]

Harbort et al.

[11] Patent Number: 4,909,593
[45] Date of Patent: Mar. 20, 1990

[54] OPTICAL CABLE HAVING AT LEAST TWO SEPARATE MULTIPLE-FIBER UNITS EACH HAVING ITS OWN SOFT PLASTIC ENVELOPE

[75] Inventors: Hans Harbort, Affalterbach; Jörg Widler, Ostfildern; Ferdinand Grögl, Beilstein, all of Fed. Rep. of Germany

[73] Assignee: Alcatel N.V., Amsterdam, Netherlands

[21] Appl. No.: 287,469

[22] Filed: Dec. 20, 1988

[30] Foreign Application Priority Data

Dec. 21, 1987 [DE]  Fed. Rep. of Germany ....... 3743334

[51] Int. Cl.$^4$ ................................................ G02B 6/44
[52] U.S. Cl. .................................................. 350/96.23
[58] Field of Search ...................................... 350/96.23

[56] References Cited

U.S. PATENT DOCUMENTS

| | | | |
|---|---|---|---|
| 4,141,622 | 2/1979 | Beal | 350/96.23 |
| 4,230,395 | 10/1980 | Dean et al. | 350/96.23 |
| 4,272,155 | 6/1981 | Slaughter | 350/96.23 |
| 4,557,560 | 12/1985 | Bohannon, Jr. et al. | 350/96.23 |

FOREIGN PATENT DOCUMENTS

| | | | |
|---|---|---|---|
| 0136913 | 4/1985 | European Pat. Off. | 350/96.23 |
| 2424041 | 12/1974 | Fed. Rep. of Germany . | |
| 2430857 | 1/1975 | Fed. Rep. of Germany . | |
| 2907704 | 9/1980 | Fed. Rep. of Germany . | |
| 3624124 | 1/1988 | Fed. Rep. of Germany | 350/96.23 |
| 52-18338 | 10/1977 | Japan | 350/96.23 |
| 1572877 | 8/1980 | United Kingdom | 350/96.23 |
| 2085188 | 4/1982 | United Kingdom . | |
| 2096343 | 10/1982 | United Kingdom | 350/96.23 |

OTHER PUBLICATIONS

Data Sheet, "Lightpack Cable", Lightguide Cable Design, Marketing Communications, 2122B, Aug. 1985.

Primary Examiner—John D. Lee
Assistant Examiner—John Ngo
Attorney, Agent, or Firm—Christie, Parker & Hale

[57] ABSTRACT

An optical cable with at least one tube (1) is disclosed which contains several multiple-fiber units (2). Each multiple-fiber unit (2) has an envelope (4) of soft plastic that can be easily removed with bare fingers.

10 Claims, 1 Drawing Sheet

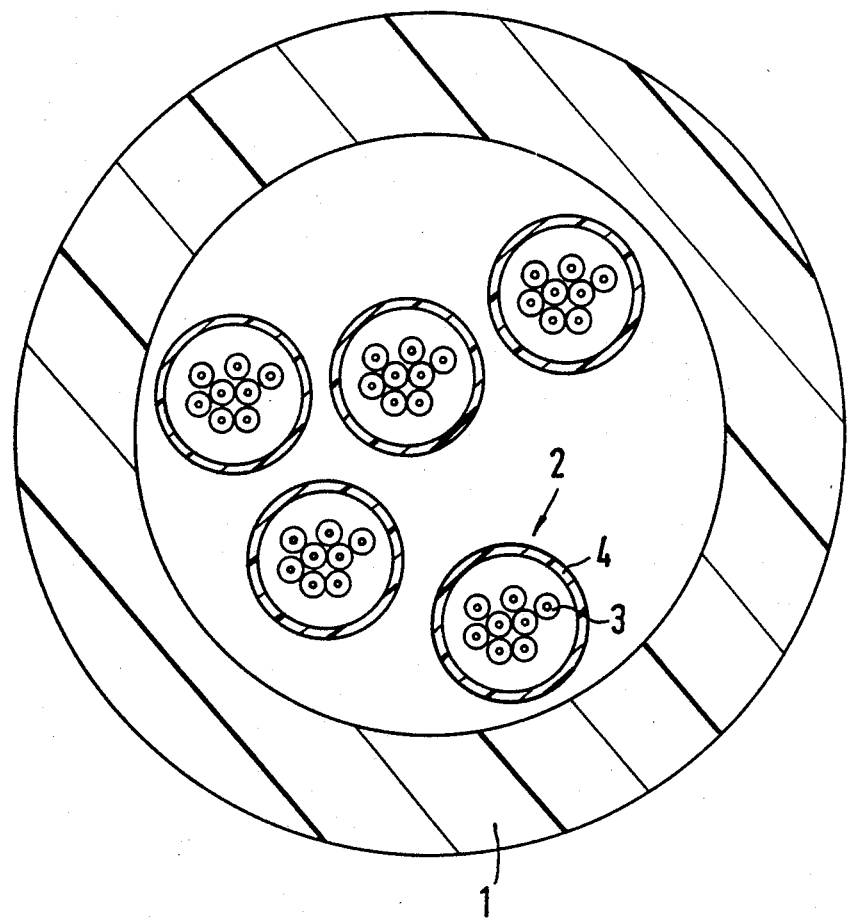

OPTICAL CABLE HAVING AT LEAST TWO SEPARATE MULTIPLE-FIBER UNITS EACH HAVING ITS OWN SOFT PLASTIC ENVELOPE

TECHNICAL FIELD

The present invention relates to an optical cable containing multiple-fiber units. Each multiple-fiber unit consists of two or more optical fibers and an envelope loosely surrounding the latter, with each fiber transmitting different information.

CLAIM FOR PRIORITY

This application is based on and claims priority from an application first filed in Fed. Rep. Germany on 12/21/87 under Ser. No. P37 43 334.2. To the extent such prior application may contain any additional information that might be of any assistance in the use and understanding of the invention claimed herein, it is hereby incorporated by reference.

BACKGROUND ART

The envelopes of multiple-fiber units which meet the specifications of the German Bundespost are made of a rigid plastic. Therefore, tools (knife, scissors, etc.) are required to remove the envelope, as is necessary in preparation for splicing, for example.

AT&T, USA, manufactures cables having a tube which contains up to 48 optical fibers (AT&T Marketing Communications 2122 B, August 1985). Bundles of 4 to 12 optical fibers are held together with color-coded yarn binders. The tube is filled with a filling compound. A tensionproof cable jacket is applied directly over the tube.

Such bundles of optical fibers permit high fiber-packing densities but require special attention during splicing, so that the fibers of the different bundles will not be mixed up. In the cables described above, an assignment of an individual optical fibers to a particular bundle at an end of a cable is hardly possible because during removal of the tube, the binders come open and all optical fibers gent into disorder.

DISCLOSURE OF INVENTION

It is the object of the present invention to provide an optical cable on which multiple-fiber splicing can be performed in a simple manner.

In accordance with the invention, each multiple-fiber unit has an envelope of soft plastic that can be easily removed without tools. Preferably, a rip filament is provided within the envelope.

The invention has the advantage that after removal of the tube, the envelopes of the individual multiple-fiber units can be removed successively, so that the optical fibers of one multiple-fiber unit cannot be mixed up with those of another mulitple-fiber unit. Another advantage results from the choice of soft plastics for the envelope, so that the latter can be easily removed with bare fingers as far as necessary.

BRIEF DESCRIPTION OF DRAWINGS

An embodiment of the invention will now be explained with reference to the accompanying drawing, whose single FIGURE shows a cross section through a tube containing five multiple-fiber units. Further embodiments are contained in the description.

BEST MODE FOR CARRYING OUT THE INVENTION

The novel optical cable, whose jacket is not shown in the FIGURE, has at least one tube 1, which is about 5 mm in diameter. The tube 1 carries fave multiple-fiber units 2 in a loose arrangement. Each multiple-fiber unit 2 consists of several optical fibers 3 and an envelope 4. The latter is made of a soft plastic which can be easily removed with bare fingers. Suitable plastics are elastomers vulcanizable at room temperature or soft thermoplastic elastomers, such as polyesteramide copolymers, soft ethylene-propylene copolymers, or a styrene-butadiene rubber. The tube is formed of a rigid, hardly shrinking plastic, such as an amorphous polyamide, a polyester, or a polycarbonate compound.

The envelopes of different multiple-fiber units may be colored differently. The same applies to the optical fibers of each multiple-fiber unit. The multiple-fiber units and/or the tube may be filled with a filling compound.

In other embodiments, each multiple-fiber unit has a rip filament which makes it easier to remove the envelope over a great length. The rip filament is a glass or aramid fiber and is marked in a particularly striking manner. It is disposed at any point between the individual optical fibers or in the envelope.

The above-described, multiple-fiber-unit-containing tubes can be used in optical cables of virtually any construction and with high fiber-packing densities. For example, a tensionproof cable jacket may be applied directly over a tube. It is also possible to arrange two or more tubes around a tensionproof central member and cover them with a cable jacket, which then need not be tensionproof.

We claim:

1. Optical cable comprising
   at least one tube made of a rigid plastic material, and
   two or more multiple-fiber units loosely carried within said tube, each of said multiple-fiber units further comprising
      a respective plurality of optical fibers and
      a respective envelope surrounding said respective plurality of optical fibers, said envelope being made of a soft plastic material whereby a predetermined portion of the envelope is easily removed from the vicinity of said optical fibers without tools.

2. An optical cable as claimed in claim 1, wherein the envelopes are made of a soft thermoplastic material.

3. An optical cable as claimed in claim 1, wherein each of said envelopes further comprises a respective rip filament contained in the space enclosed by the envelope or integral with the envelope.

4. An optical cable as claimed in claim 3, wherein the rip filament is a glass or aramid fiber.

5. An optical cable as claimed in claim 1, wherein the rigid plastic material from which the tube is made is selected from the group consisting essentially of amorphous polyamide, polyester, and a polycarbonate compound.

6. An optical cable as claimed in claim 1, wherein the tube is filled with a soft, pasty compound.

7. An optical cable as claimed in claim 1, further comprising at least one additional tube, the at least one tube and the at least one additional tube being arranged concentrically around a central member.

8. An optical cable as claimed in claim 1, wherein the multiple-fiber units are filled with a soft, pasty compound.

9. Optical cable comprising
   at least one tube, and
   two or more multiple-fiber units loosely carried within said tube, each of said mulitple-fiber units further comprising
      a respective plurality of optical fibers and a respective envelope surrounding said respective plurality of optical fibers,
wherein the envelopes are made of a vulcanizable elastomer.

10. Optical cable comprising
    at least one tube, and
    two or more multiple-fiber units loosely carried within said tube, each of said mulitple-fiber units further comprising
       a respective plurality of optical fibers and
       a respective envelope surrounding said respective plurality of optical fibers,
wherein the envelopes are made of a soft thermoplastic material selected from the group consisting essentially of polyesteramide copolymer, a soft ethylene-propylene copolymer, and a styrene-butadiene rubber.

* * * * *

UNITED STATES PATENT AND TRADEMARK OFFICE
CERTIFICATE OF CORRECTION

PATENT NO. : 4,909,593

DATED : March 20, 1990

INVENTOR(S) : Hans Harbort; Jörg Widler; Ferdinand Grögl

It is certified that error appears in the above-identified patent and that said Letters Patent is hereby corrected as shown below:

Column 1, line 40, change "fibers" to -- fiber --.

Column 1, line 44, change "gent" to -- get --.

Column 2, line 6, change "fave" to -- five --.

Signed and Sealed this

Tenth Day of December, 1991

Attest:

HARRY F. MANBECK, JR.

Attesting Officer

Commissioner of Patents and Trademarks